INVENTOR.
EDWARD G. OBEDA
BY
Ervin B. Steinberg

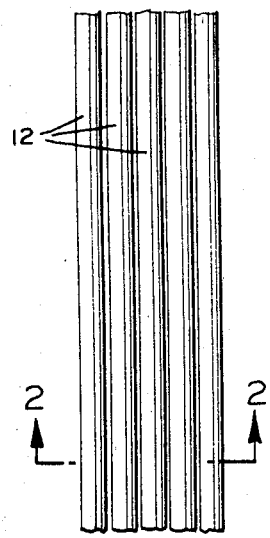
FIG. 1
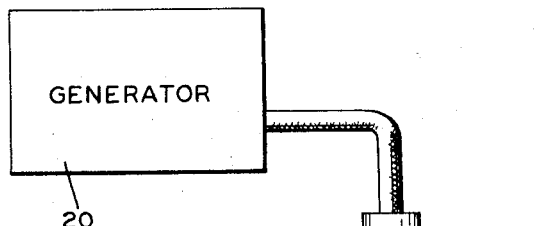
FIG. 3
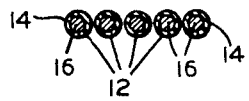
FIG. 2
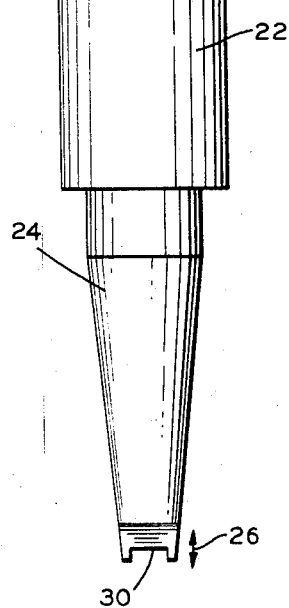
FIG. 4
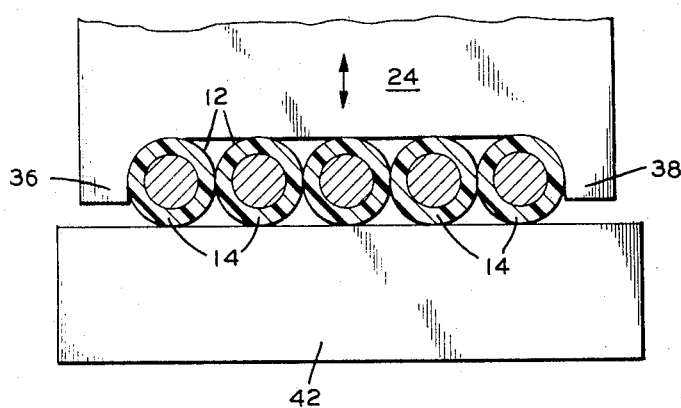
INVENTOR.
EDWARD G. OBEDA April 22, 1969 E. G. OBEDA 3,440,118
METHOD AND APPARATUS FOR BONDING TOGETHER A PLURALITY OF
INSULATED ELECTRICAL CONDUCTORS BY SONIC ENERGY
Filed Dec. 17, 1965 Sheet 2 of 2

United States Patent Office 3,440,118
Patented Apr. 22, 1969

3,440,118
METHOD AND APPARATUS FOR BONDING TOGETHER A PLURALITY OF INSULATED ELECTRICAL CONDUCTORS BY SONIC ENERGY
Edward G. Obeda, Brookfield, Conn., assignor to Branson Instruments, Incorporated, Stamford, Conn., a corporation of Delaware
Filed Dec. 17, 1965, Ser. No. 514,616
Int. Cl. B32b *31/24;* H01b *13/10*
U.S. Cl. 156—73                 6 Claims

ABSTRACT OF THE DISCLOSURE

A plurality of wires, each being provided with a thermoplastic jacket, are fastened together by supporting the wires in juxtaposition on a flat surface, contacting the exposed upper sides with a sonically vibrating horn which causes the respective jackets to be squeezed sideways, whereby the dissipation of sonic energy causes frictional heating of the thermoplastic material to effect bonding of the juxtaposed jackets.

This invention generally refers to a method and apparatus for fastening together a plurality of wires. More specifically, this invention refers to a method and apparatus for providing a flat package of electrical conductors or wires which are provided with a thermoplastic covering whereby to eliminate the need for separate wrapping or banding means.

When arranging electrical conductors or wires in electrical and electronic assemblies, a great deal of effort and time is spent in fastening the wires to each other so as to provide a clean and neat bundle. These wires, most frequently, are held together by lacing cord, or metallic or plastic wire wraps which are spaced at certain intervals along the length of the conductors. Not only is this method tedious and time consuming, but moreover additional items of supply are needed which merely serve for fastening the conductors to each other. When a wrapped bundle needs to be inserted or fed through a tubing, the wrapping element increases the diameter of the bundle and frequently interferes with the blunt ends of telescoped tube sections, thereby rendering the feeding through difficult and sometimes impossible.

The method and apparatus described hereafter overcomes the above stated disadvantages and provides a method for fastening electrical wires and conductors to each other without the need for extra banding or wrapping material. Moreover, the method described causes the conductors to be held in a flat package, which arrangement is extremely flexible and demands no more space than the conductors by themselves. Therefore, such a package can be fed through very narrow gaps and spaces without any difficulty.

One of the principal objects of this invention is, therefore, the provision of a new and improved method and apparatus for bonding wire.

Another important object of this invention is the provision of a new and improved method for bonding electrical conductors and wires to each other without the need for banding and wrapping.

A further object of this invention is the provision of a new and improved method for bonding together the outer jackets of electrical conductors by means of sonic energy so as to provide a new and improved package of electrical conductors.

A still further object of this invention is the provision of a new and improved method and apparatus for providing a flat package of electrical conductors, the conductors being held to each other by fusing the thermoplastic material of adjacent conductors to one another at predetermined locations.

Figure 5:
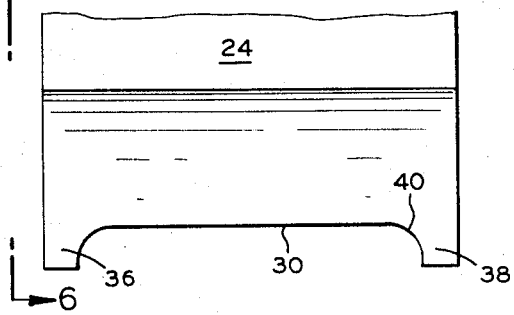
Figure 6:
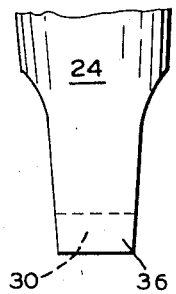
Figure 7:
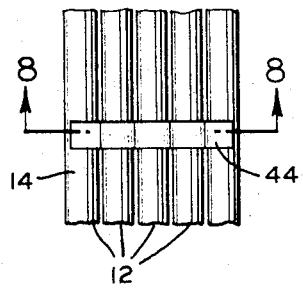
Figure 8:
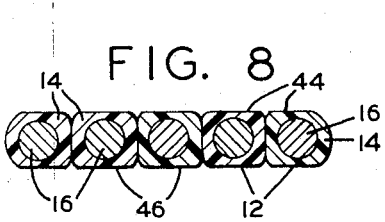
Figure 9:
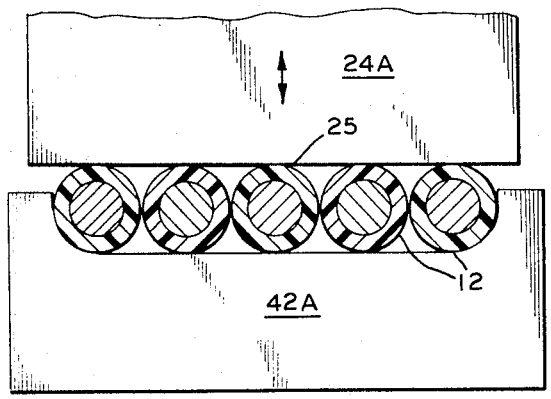

Further and still other objects of this invention will be more clearly apparent by reference to the following description when taken in conjunction with the accompanying drawings in which:

FIGURE 1 is a top plan view of a plurality of juxtaposed electrical conductors, commonly called wires;
FIGURE 2 is a sectional view along lines 2—2 in FIGURE 1;
FIGURE 3 is a schematic illustration of a typical generator and transducer used to provide sonic vibrations;
FIGURE 4 is a typical embodiment of the present invention, showing the process of bonding together the wires per FIGURE 1;
FIGURE 5 is an elevational view of the front surface of the horn which is adapted to engage the wires;
FIGURE 6 is a view along lines 6—6 in FIGURE 5;
FIGURE 7 is a top plan view of the wires per FIGURE 1 when fastened to each other by the method shown in FIGURE 4;
FIGURE 8 is a sectional view along lines 8—8 of FIGURE 7, and
FIGURE 9 is a sectional view of an alternative embodiment.

Referring now to the figures and FIGURES 1 and 2 in particular, there is shown a set of juxtaposed electrical conductors or wires 12, each of the conductors comprising a conventional outer jacket 14 of thermoplastic material and an inner electrical conductor 16, usually copper. The material 16 may be solid or stranded. The outer jacket serves for electrical insulation. The wires, as shown, are disposed in juxtaposition and in a single plane. In the heretofore known method, such wires are fastened together by lacing cord, metal or plastic clamps, wraps, sheathing, or other material as is commonly available for this purpose.

In accordance with the method described hereafter, the wires are secured to one another by a brief application of sonic energy using the device illustrated in FIGURE 3 wherein numeral 20 identifies a high frequency generator which provides electrical energy, typically 20,000 cycles per second, to an electro-acoustic transducer 22 which converts the received electrical energy to mechanical vibrations by means of a piezoelectric element. The converter drives a horn 24 coupled thereto. The vibrations at the frontal surface, or tip, of the horn are in the longitudinal direction as shown by the arrow 26. The generator 20 together with the transducer 22 and a suitable horn 24 may be purchased as a commercial item from Branson Instruments, Incorporated, Branson Sonic Power Division, Danbury, Conn., as "Sonifier" Ultrasonic Welder, Model S-75 or equivalent.

FIGURES 4 to 6 show the arrangement for bonding the wires together. As seen in these illustrations, the front end of the horn 24 is provided with a recess 30 for receiving therein the plurality of wires 12. The length of the recess 30 is terminated by the projections 36 and 38 and the space between the projections, defining the recess length, is dimensioned so that the desired quantity of electrical wires is disposed in side-by-side relation, the insulation of adjacent wires preferably being in physical contact with one another. In order to avoid a high mechanical stress concentration, the recess of the horn is provided with a radius 40 which may be contoured to follow the diameter of the wire. The depth of the recess 30 is somewhat smaller than the outer diameter of the wire. As seen in FIGURE 4, the plurality of wires 12 is disposed within the recess 30 of the horn 24 and an anvil 42 provides a support for the underside of the wires. Upon activating the generator 20, the tip of the horn 24 vibrates toward and away from the anvil 42 at a frequency of 20 kc. per second with an excursion of approximately 0.003 inch. This high intensity oscillation produces frictional heating of the thermoplastic material 14 and, as the acoustic energy is dissipated, the thermoplastic insulation softens and is caused to flow. Upon de-activating the generator 20, the insulation of adjacent wires is fused and the wires are fastened together as a flat package.

FIGURES 7 and 8 show the wires after removal from the space between the horn 24 and the anvil 42. The formerly round wires are somewhat flattened at the area of contact with the horn 24 and the anvil 42 as illustrated by the numerals 44 and 46. At these particular areas the insulating material has been squeezed sideways toward the adjacent wire.

It will be apparent that when applying too much force or maintaining the sonic energy for too long a time, the thermoplastic insulation might be completely removed and one or more wires laid bare. This is prevented by timing the generator so that the energy is applied for a very brief period, usually a second or less. Moreover, the depth of the recess 30 can be dimensioned so that the projections 36 and 38 provide a suitable limit for the motion of the horn toward the anvil 42, thus limiting the motion of the horn upon the wires.

FIGURE 9 shows an alternative embodiment wherein the anvil 42A is provided with the recess to receive the wires 12, and the horn 24A has a plane frontal surface 25.

In a typical example, seven electrical conductors #18 insulated with polyvinyl chloride material have been fastened together by this process in less than one second. It will be apparent that similar results can be achieved with other diameter wires and a different quantity of conductors. Although an ultrasonic energy source having a frequency of 20 kc./sec. has been found most suitable for the foregoing application, it should be understood that other frequencies within the sonic or ultrasonic range may be used.

What is claimed is:

1. An apparatus for bonding a plurality of individual elements, each element having a jacket of thermoplastic material on the outer surface comprising:
   means for supporting the underside of the respective elements in a first plane and in juxtaposition;
   a sonic vibrating means, movable in a second plane substantially normal to said first plane, disposed to engage the jacket of each element for applying ultrasonic energy thereto and, responsive to such engagement, said jackets being squeezed cyclically and urged to flow generally in a direction along said first plane toward adjacent elements;
   the dissipation of sonic energy effecting a softening of the thermoplastic material and causing flowing thereof, and
   means coacting between said means for supporting and said vibrating means for limiting the motion of said sonic vibrating means relative to said elements whereby to prevent said vibrating means from breaking through the jackets.

2. The method of bonding together a plurality of juxtaposed wires which have an outer jacket of thermoplastic material, comprising the steps of:
   supporting the underside of the respective wires on a surface and causing the sides of adjacent wires to be in juxtaposition;
   contacting the upper sides of said plurality of wires with a sonically vibrating implement and urging said implement against the wires;
   said thermoplastic material, responsive to the vibratory contact by said implement, being urged to flow sideways, and the dissipation of sonic energy causing the thermoplastic material to soften and flow toward adjacent wires, and
   interrupting the sonic energy applied to said implement whereby the softened thermoplastic material is permitted to harden, causing the thermoplastic jacket material of juxtaposed wires at the area of contact by the implement to be bonded together.

3. The method of bonding together a plurality of juxtaposed wires as set forth in claim 2, said implement being applied to contact the upper sides of said wires in a direction transverse to the longitudinal axes of said wires.

4. The method of bonding together a plurality of juxtaposed wires as set forth in claim 2, said sonically vibrating implement operating in the ultrasonic frequency range.

5. The method of bonding together a plurality of juxtaposed wires as set forth in claim 2, said implement being an acoustic horn which is driven by an electro-acoustic transducer.

6. The method of bonding together a plurality of juxtaposed wires as set forth in claim 2, wherein said sonically vibrating implement is urged against the wires in a direction substantially normal to the plane of the surface supporting the underside of the wires.

References Cited

UNITED STATES PATENTS

| 3,300,851 | 1/1967 | Lodder | 156—73 XR |
| 2,441,071 | 5/1948 | Jahant | 156—181 |
| 3,316,134 | 4/1967 | Durakis et al. | 264—248 XR |
| 3,367,809 | 2/1968 | Soloff | 156—73 |

PHILIP DIER, Primary Examiner.

U.S. Cl. X.R.

29—470.1; 156—306, 580; 161—143; 174—113; 228—1; 264—23, 248